(12) United States Patent
Breeden

(10) Patent No.: US 6,390,742 B1
(45) Date of Patent: May 21, 2002

(54) LOCKING CONE CHASSIS

(76) Inventor: Larry O. Breeden, 11427 188th Avenue Ct. E., Sumner, WA (US) 98390

( * ) Notice: Subject to any disclaimer, the term of this patent is extended or adjusted under 35 U.S.C. 154(b) by 0 days.

(21) Appl. No.: 09/697,284

(22) Filed: Oct. 27, 2000

Related U.S. Application Data

(60) Provisional application No. 60/166,739, filed on Nov. 22, 1999.

(51) Int. Cl.⁷ .................................................. B60P 7/08
(52) U.S. Cl. .......................... 410/77; 410/71; 410/80; 410/82; 410/84
(58) Field of Search ............................. 410/71, 77, 78, 410/80, 82, 83, 84, 54; 280/406.1, 656, DIG. 8; 296/181; 248/681, 500, 503; 24/287

(56) References Cited

U.S. PATENT DOCUMENTS

| | | | |
|---|---|---|---|
| 3,111,341 A | * 11/1963 | Fujioka et al. ................. | 410/82 |
| 3,438,671 A | 4/1969 | Seng | |
| 3,614,153 A | 10/1971 | Tantlinger et al. | |
| 3,701,562 A | * 10/1972 | Carr ............................ | 410/82 |
| 3,752,511 A | * 8/1973 | Racy ......................... | 410/82 X |
| 3,767,255 A | 10/1973 | Bertolini ...................... | 410/82 |
| 3,788,683 A | * 1/1974 | Rumell ..................... | 410/71 X |
| 4,537,540 A | 8/1985 | Boughton .................... | 410/82 |
| 4,776,736 A | * 10/1988 | Tatina ......................... | 410/83 |
| 5,127,781 A | 7/1992 | Roarty et al. ................. | 410/82 |
| 5,507,514 A | 4/1996 | Jacques et al. | |
| 5,722,688 A | 3/1998 | Garcia | |
| 5,794,960 A | 8/1998 | Sill et al. | |
| 5,836,657 A | * 11/1998 | Tilley et al. .............. | 410/82 X |
| 5,893,692 A | * 4/1999 | Asanuma ..................... | 410/83 |
| 5,924,829 A | 7/1999 | Hastings ..................... | 410/82 |
| 6,027,291 A | * 2/2000 | Sain et al. .................... | 410/35 |
| 6,074,142 A | * 6/2000 | Schulz ........................ | 410/83 |
| 6,210,088 B1 | * 4/2001 | Crosby ........................ | 410/35 |

FOREIGN PATENT DOCUMENTS

GB        1151381        5/1969

* cited by examiner

Primary Examiner—Stephen T. Gordon
(74) Attorney, Agent, or Firm—Richard C. Litman

(57) ABSTRACT

A locking cone chassis and several use methods to eliminate double and triple handling of shipping freight containers. The chassis device comprises two parallel I-beam main rails, a plurality of transverse ribs, a forward cone receiver formed from steel square tubing affixed to a forward end of the main rails, and a similar rear cone receiver affixed to the rear end of the main rails, the only essential difference between the receivers being that the forward cone receiver has an upper flange to guide and to stop a freight container. Each receiver has two box-shaped end portions, which operate like the corner pockets of a freight container—that is, each box-shaped end portion receives a locking cone through an upper surface cone receiving aperture. Each end portion also has access apertures for manually unlocking a cone.

2 Claims, 5 Drawing Sheets

LOCKING CONE CHASSIS

CROSS-REFERENCE TO RELATED APPLICATION

This application claims the benefit of U.S. Provisional Patent Application Ser. No. 60/166,739, filed Nov. 22, 1999.

BACKGROUND OF THE INVENTION

1. Field of the Invention

The present invention relates to handling containerized cargo, and more specifically, to a truck chassis device used for containing, coupling and transporting metal shipping containers.

2. Description of Related Art

Prior "container chassis" used in the process of transporting large containers in the shipping industry have been, in the recent past, confined essentially to four categories: first, 'boaster chassis;' second, 'flat bed chassis;' third, 'bombcart chassis;' and finally, 'pin chassis.' For various reasons, only pin chassis are used for transporting most containers being shipped over the road.

Pin chassis are street legal and ISO (International Organization for Standardization) standardized. Standard freight containers generally conform to specific construction details as adopted by the ISO. Standard chassis come in several lengths including 20 feet, 35 feet, 40 feet, 45 feet, and some that are 53 feet.

However, loading and unloading cargo from pin chassis for above deck storage on a ship can be very time consuming, because the containers coming off the deck of a ship have stacking cones in them. A six man crew is required to load or off-load containers onto or off of a pin chassis. The crew pulls a pin chassis to a position underneath the crane being used to remove containers from the ship and set them on the pin chassis. The gangmen on the dock must then pull the cones out of the container, and then use the crane to land the container on the chassis. Then extra men pull the pin, and turn the handle on the back of the pin chassis turning the cone integral to the pin chassis to lock the container to the chassis. After the container is set on the chassis, it is taken to an area where it is parked in a row for later pick up and transport. An empty chassis to be loaded is returned from the row. As cones are removed from containers coming off of the ship's deck, they are placed in a cone bin box.

Once the ship has been completely unloaded and is ready to receive containers, the cone removal process is reversed. Cones are taken from the bin box and placed into the bottom of each container being placed on the deck, after each has been hoisted up from the chassis. After the ship is reloaded, the bin box, with any remaining cones, is hoisted back onto the ship.

Removal of the cones from the container for unloading from the deck and replacement of the cones into the container for loading the ship's deck, summarizes the problem in using the pin chassis. Thus, a new category of chassis has been needed to eliminate the double and triple handling of container freight and the locking cones used in linking the freight containers.

The prior art discussed below does not address this issue.

U.S. Pat. No. 5,722,688 issued to Garcia, R. R. on Mar. 3, 1998 describes a unibeam trailer chassis. Garcia does not disclose cone receiving end portions, nor does it disclose methods of using the device.

U.S. Pat. No. 3,767,255 issued to Bertolini, W. A. on Oct. 23, 1973 describes a chassis with a locking device at each of four corners. The Bertolini device is not capable of independently receiving locking cones since the Bertolini locking mechanism is already part of the chassis. Moreover, Bertolini does not disclose any methods of using the device.

British Patent No. 1,151,381 published on May 7, 1969, and invented by Ellis, M. describes a vehicle frame for the transport of freight containers. Ellis does not teach the present invention as claimed.

U.S. Pat. No. 5,924,829 issued to Hastings, T. M. on Jul. 20, 1999 describes a goosenecked chassis. Hastings does not teach the U.S. Pat. No. 5,507,514 issued to Jacques, C. H. on Apr. 16, 1996 describes a dockable container chassis. Jacques does not teach the present invention as claimed.

U.S. Pat. No. 3,438,671 issued to Seng, P. J. on Apr. 15, 1969 describes a cargo adaptor frame with corner twist locks. Seng does not teach the present invention as claimed.

U.S. Pat. No. 5,127,781 issued to Roarty et al. on Jul. 7, 1992 describes a chassis conversion saddle. Roarty et al. do not teach the present invention as claimed.

U.S. Pat. No. 4,537,540 issued to Boughton, T. T. on Aug. 27, 1985 describes transport frames for vehicles. Boughton does not teach the present invention as claimed.

U.S. Pat. No. 5,794,960 issued to Sill et al. on Aug. 18, 1998 describes a chassis with convertible gooseneck. Sill et al. do not teach the present invention as claimed.

U.S. Pat. No. 3,614,153 issued to Tantlinger et al. on Oct. 19, 1971 describes a trailer chassis. Tantlinger et al. do not teach the present invention as claimed.

None of the above inventions and patents, taken either singly or in combination, is seen to describe the instant invention as claimed.

SUMMARY OF THE INVENTION

The present invention is a "locking cone chassis" including methods for its use. The invention eliminates double and triple handling of shipping freight containers. The chassis device essentially comprises two parallel I-beam main rails, a plurality of transverse ribs, a forward cone receiver formed from steel square tubing affixed to a forward end of the main rails, and a similar rear cone receiver affixed to the rear end of the main rails, the only essential difference between the two receivers being that the forward cone receiver has an upper flange to guide and to stop a freight container. Each receiver has two box-shaped end portions, each of which operates like the pocket of a freight container—that is, it receives a locking cone through a cone receiving aperture on its upper surface. Each end portion also has access apertures for manually unlocking a locking cone.

Four methods of using the locking cone chassis are disclosed, including two methods for using the locking cone chassis to discharge a freight container from a ship to a dock, and two methods for using locking cone chassis in the load-back of freight containers from a dock to a ship. The present invention also calls for two separate chassis staging areas to account for how freight containers are typically stored above deck and below deck, that is, with and without locking cones, respectively.

Accordingly, it is a principal object of the invention to make the unloading and loading of shipping freight faster and more efficient.

It is another object of the invention to make the unloading and loading of shipping freight safer.

It is a further object of the invention to make the unloading and loading of shipping freight less expensive.

Still another object of the invention is to provide a new type and category of container chassis.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
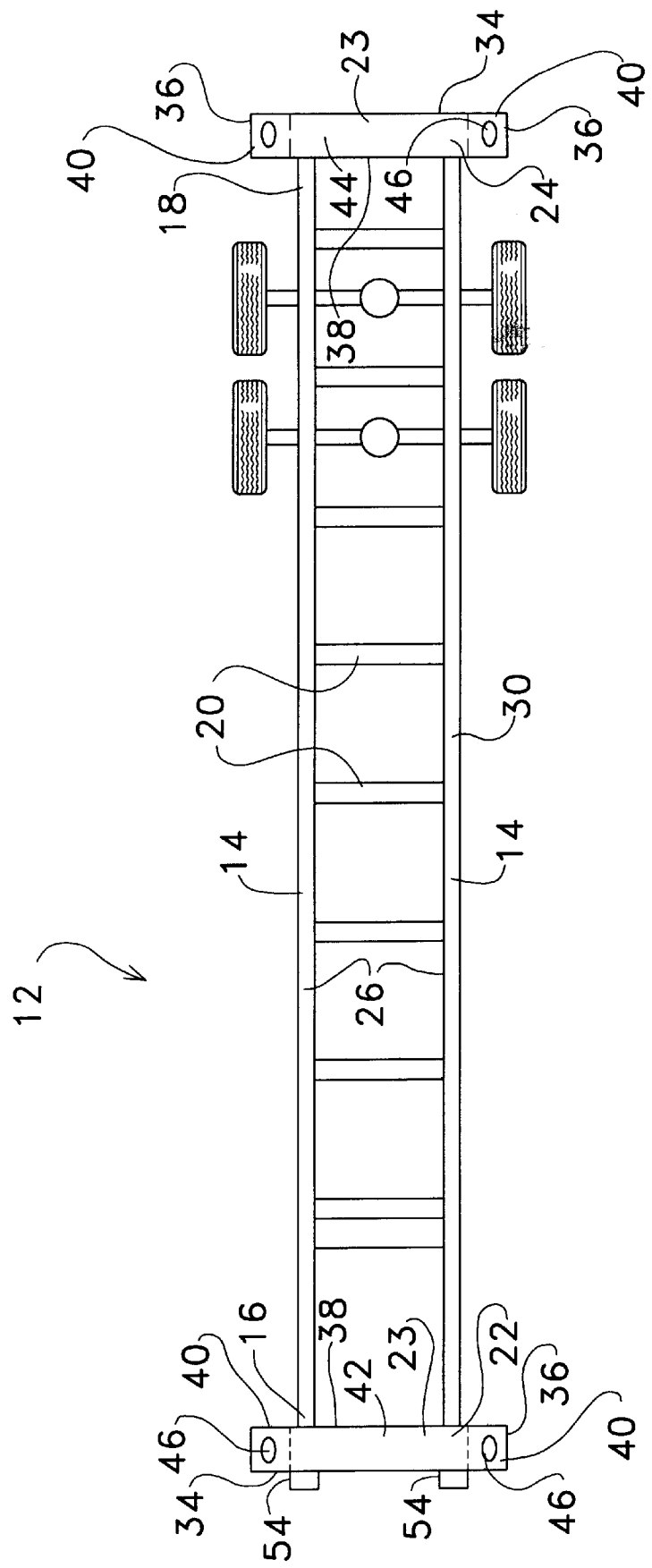
FIG. 1 is a top view of a locking cone chassis according to the present invention.
Figure 2:
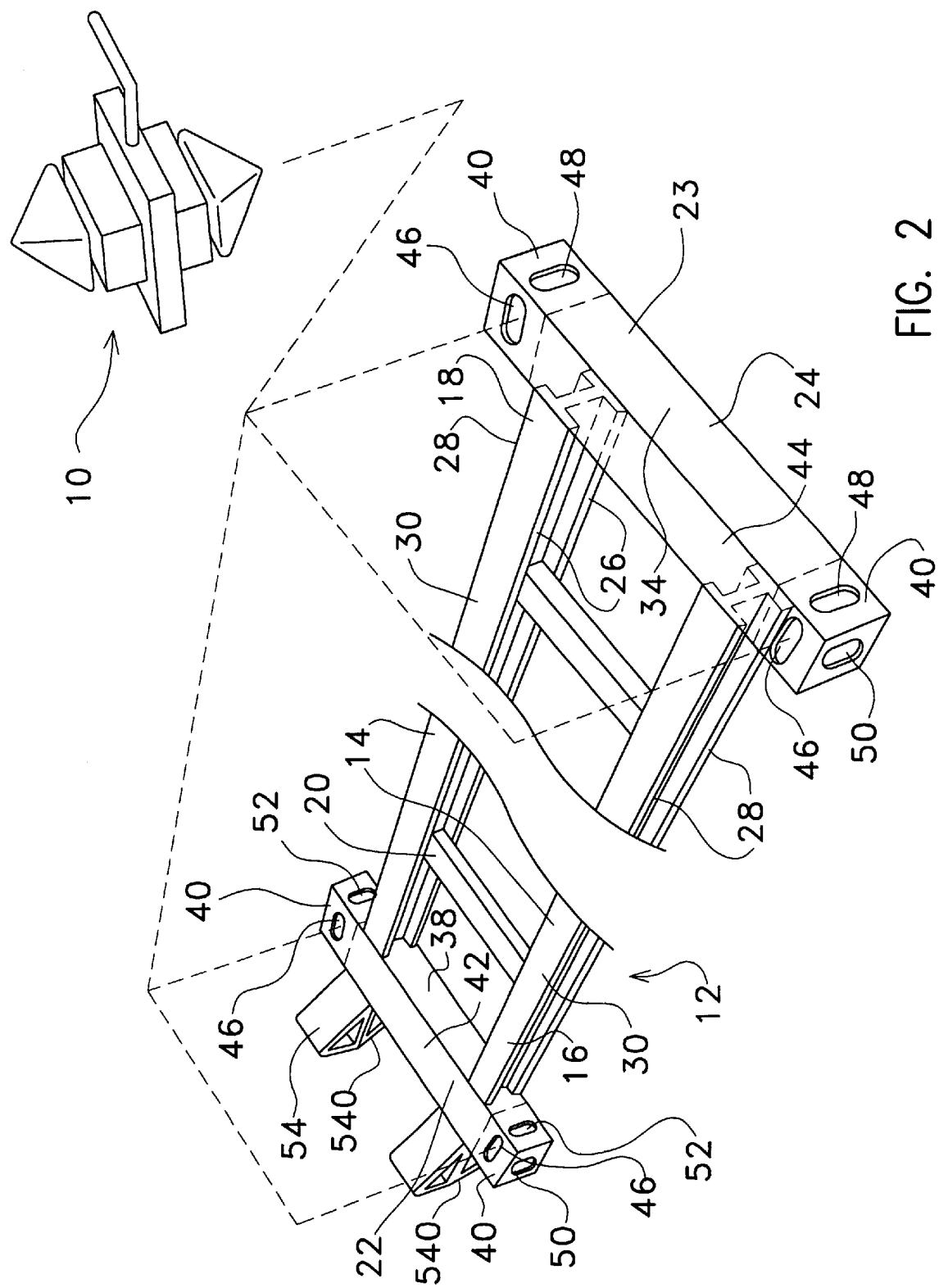
FIG. 2 is a fragmented perspective view of the chassis with ribs cut out to emphasize the forward cone receiver and the rear cone receiver.

The present invention, as best shown in FIGS. 1 and 2, is a locking cone chassis 12, comprising two parallel I-beam main rails 14 having a forward end 16 and a rear end 18, a plurality of transverse ribs 20 connecting main rails 14 in parallel between end 16 and end 18, a forward cone receiver 22 affixed to forward end 16 and normal to main rails 14, and a rear cone receiver 24 affixed to rear end 18 and normal to main rails 14.

Each rib 20 is preferably approximately 36 inches long and has cross sectional shape of a 3/16 inch thick, 6 inch tall C-channel. Ribs 20 are preferably 40 inches apart.

Main rails 14 preferably are formed from 3/8 inch thick steel I-beams. Preferably the cross sectional dimension of main rail 14 is an 8 to 12 inch web by 4 inch wide flanges, with a range in length anywhere from approximately 20 feet in length to 53 feet in length. Each of main rails 14 has a pair of inside edges 26 defined by the edge of the flanges facing the inside of the chassis 12, a pair of outside edges 28 defined by the edges of the flanges facing the outside of the chassis 12, and a top surface 30.

Rear cone receiver 24 is substantially identical to forward cone receiver 22, and each generally comprises a main shaft 23 preferably made from 3/8 inch to 3/4 inch thick steel square tubing. Main shaft 23 has a length of approximately 7 feet. Receivers 22 and 24 are approximately 8 feet in length between end surfaces. Each of receivers 22 and 24 has an outside surface 34, two opposite end surfaces 36, and an inside surface 38. Forward cone receiver 22 has a forward upper surface 42, while rear cone receiver 24 has a rear upper surface 44.

As best shown in FIG. 2, each receiver 22, 24 has two opposing box-shaped end portions 40. End portions 40, extending from each opposite end of main shaft 23, are preferably made from 1 inch thick steel, and are preferably 5 inches tall by 7 inches wide by 6 and 1/2 inches long. Each of end portions 40 is disposed slightly outside of outside edge 28 of main rails 14. Each end portion 40 has a cone-receiving aperture 46 on its upper surface 42, 44. Each of end portions 40 also has a first access aperture 48, preferably on outside surface 34. Each of end portions 40 preferably has a second access aperture 50, preferably on end surface 36. Finally, each of the end portions 40 may have a third access aperture 52 on inside surface 38. Each access aperture 48, 50, 52 provides access to manually unlock cone 10 if the locking mechanism of cone 10 should fail. Each access aperture is preferably approximately 2 inches wide by 3 inches long, but may be slightly larger or smaller to serve the purpose of tool access to locking cone 10.

Each cone receiving aperture 46 of chassis 12 receives a self-locking cone 10. Self-locking cone 10 is of a type well known in the art, and is a post coupler with a pair of pivoting pyramids mounted on opposite ends of the post, one end being disposed in the bottom of container 11, the other end being inserted into aperture 46. The aperture 46 is dimensioned and configured for receiving the rectangular flange interposed between the pyramid and the center plate of the cone. Thus, chassis 12 links to a container 11 at two end points of each cone receiver 22, 24—that is, at four points in total. Each cone receiving aperture 46 is shaped like a rectangle with two oval-shaped opposite ends so as to receive the locking mechanism of a locking cone 10. The dimensions of aperture 46 are approximately 5 inches long by 3 inches wide.

Guide flange 54 on forward cone receiver 22 serves both as a guide for container 11 as well as a container stop, operable when a truck 13 that is hauling chassis 12 operates its brakes. Forward cone receiver 22 has at least one, and preferably two guide flanges 54 angled upward, and away from chassis 12, from forward upper surface 42, proximate outside surface 34, and between each inside edge 26 of main rails 14. Flanges 54 are supported preferably by support flanges 540, that are fixed to an upper part of outside surface 34. Flanges 540 are similar to flanges 54, but are rotated 180° so as to form a parallelogram with flanges 54.

Rear cone receiver 24 may be manufactured directly from steel square tubing, or it may be retrofitted from a pin chassis by cutting off the back manual locks of the pin chassis, and welding a box-shaped end portion 40 to each end of the existing rail, wherein the existing rail is analogous to main shaft 23. Forward cone receiver 22 may also be manufactured directly from steel square tubing, or it may be retrofitted from a pin chassis by cutting approximately 8 inches off of each end of the main front rail (where the pin would normally be inserted), and then by welding a 14 inch wide by 28 inch long by 3/4 inch thick piece of steel to the bottom of the main front rail. Then the cone receiving apertures and/or the access apertures may be cut from the ends of the main front rail.

Figure 3:
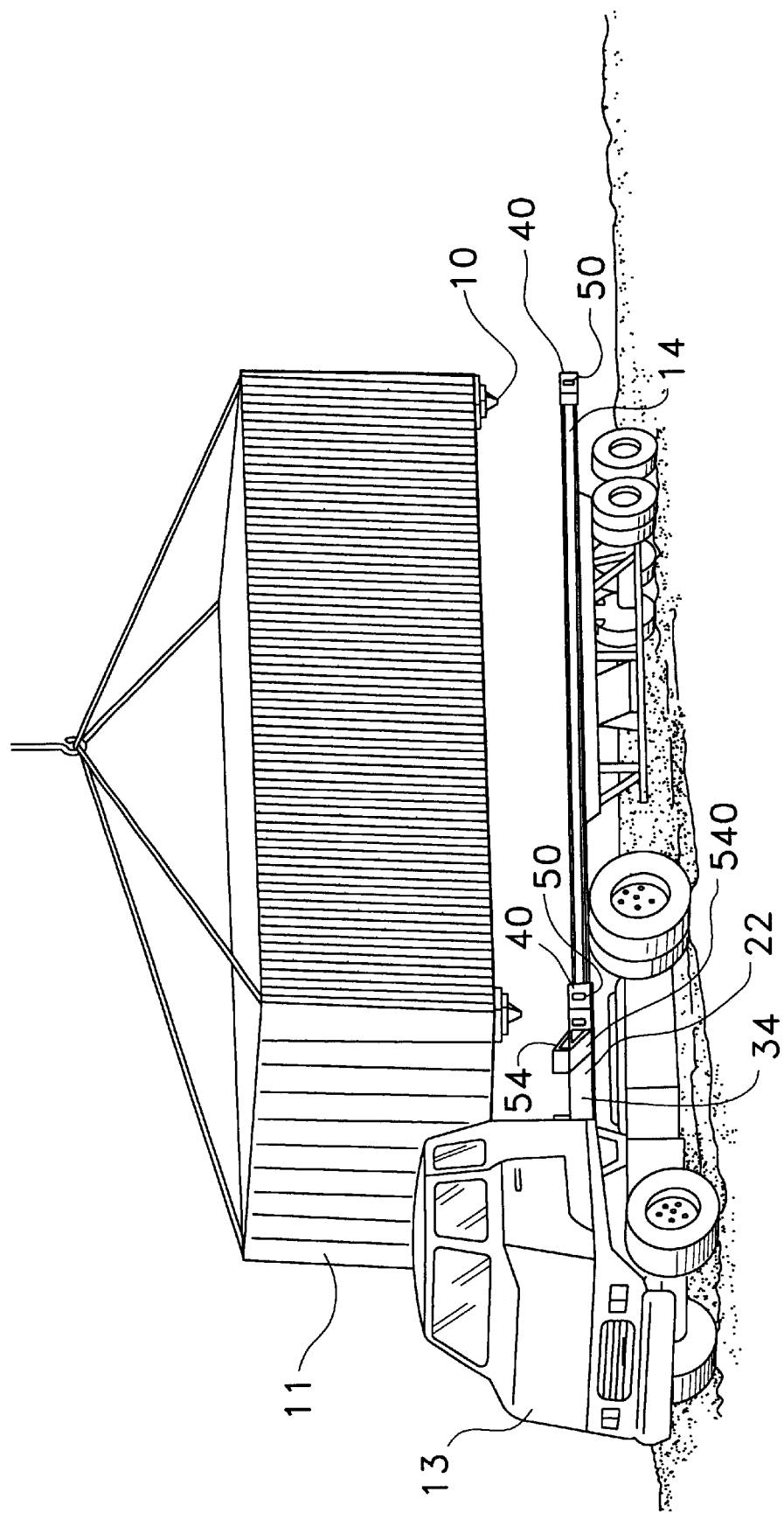
FIG. 3 is a perspective view of a container being loaded onto a chassis according to the present invention.
Figure 4:
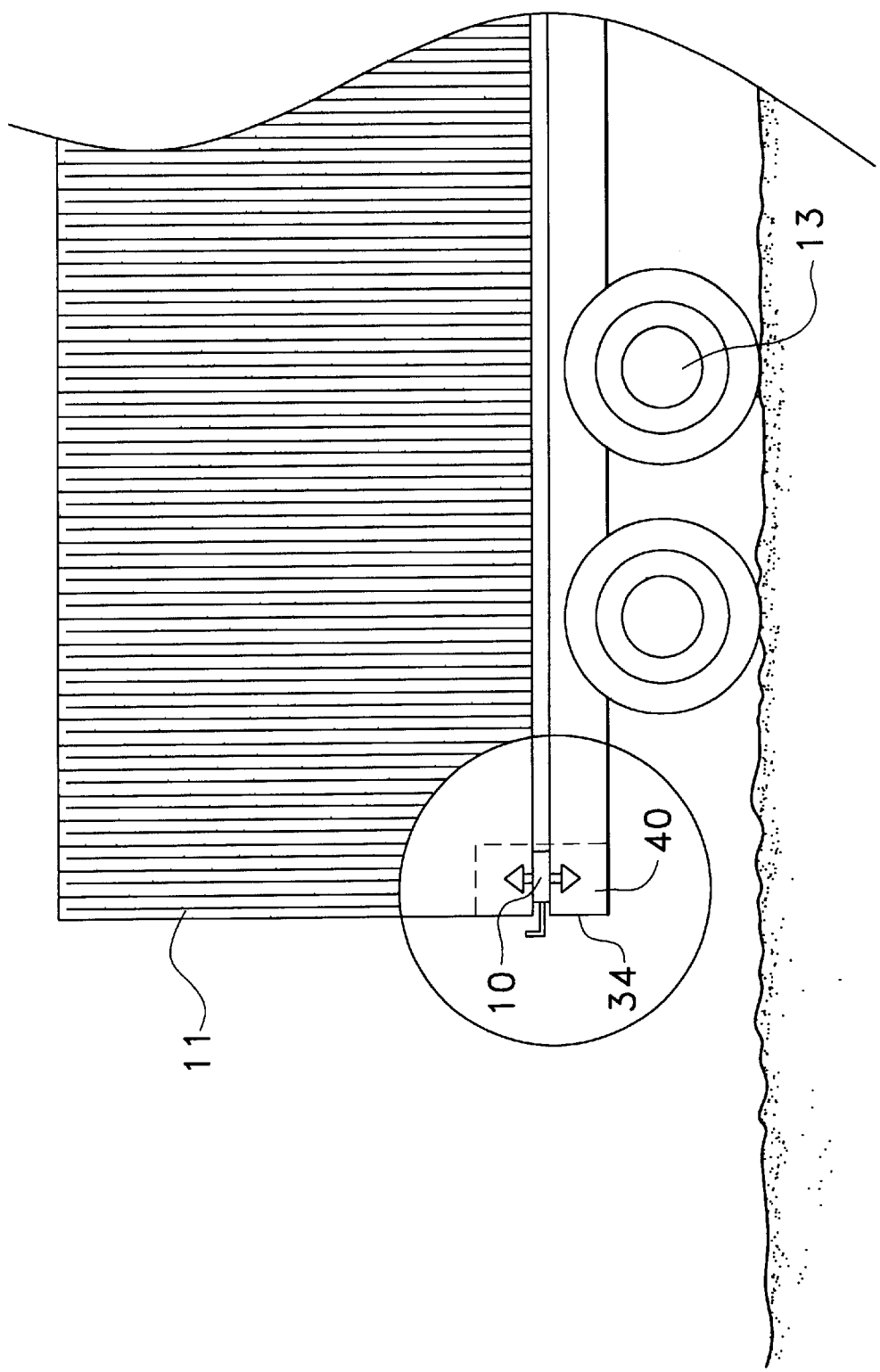
FIG. 4 is a side view of a freight container fitted on to the chassis provided by the present invention.
Figure 5:
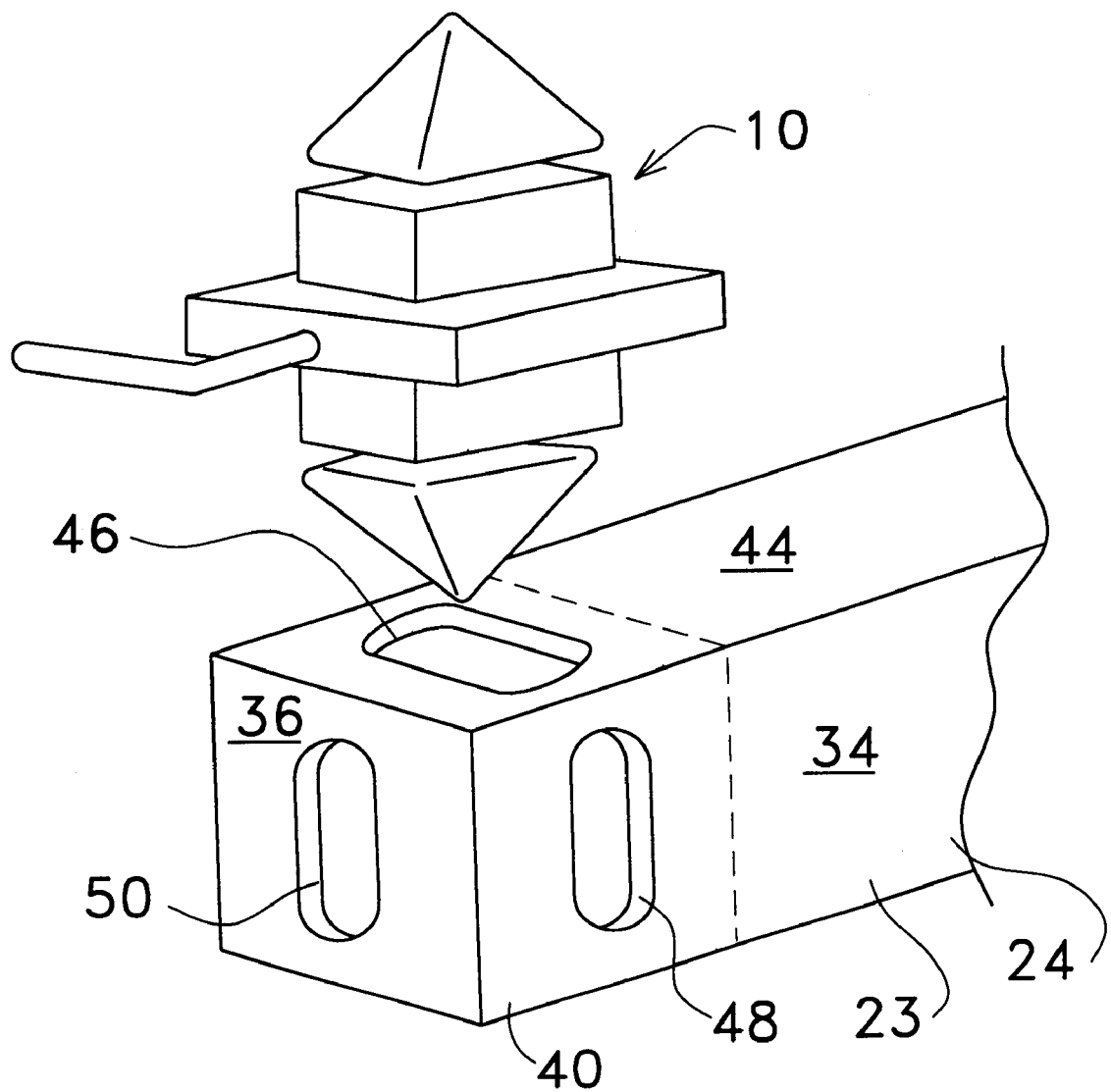
FIG. 5 is an exploded view, showing an end portion of the rear cone receiver.

FIGS. 3 through 5 disclose the linking of container 11 to chassis 12. FIG. 5 also shows a locking cone 10. Four methods of using the locking cone chassis 12 are disclosed as follows: First, there are two methods for using locking cone chassis 12 to discharge a freight container 11 from a ship to a dock—that is, one method for below deck discharge, and one method for above deck discharge. Second, there are two methods for using locking cone chassis 12 in the load-back of freight containers from a dock to a ship—that is, one method for below deck load-back, and one method for above deck load-back.

Before delving into the details of each container handling method, it is necessary to provide several definitions that are used in the forthcoming methodologies. "Load-back" shall mean the loading of a freight container from a dock to a ship hatch (above deck or below deck) onboard a shipping vessel. "Discharge" shall mean the removal of a freight container from a ship hatch (above deck or below deck) to a dock. "Below deck" freight containers typically are stored in a series of "cell guides," where no locking cones are required between containers. "Above deck" freight containers are typically stacked one on top of the other, using a locking cone at each of four corners of each container.

Although the present invention of a locking cone chassis 12 does not purport to modify the containers, or how those containers are stored on a ship, chassis 12 does necessitate the establishment of four new container handling methods that take into account the typical above deck and below deck stacking, loading, and unloading methods. The present invention also calls for two separate chassis staging areas. The "first staging area" shall store locking cone chassis that have a cone 10 inserted into each aperture 46. The "second staging area" shall store locking cone chassis that do not have a cone 10 in any aperture 46.

(i) The first method disclosed, of discharging freight container 11 using locking cone chassis 12, accounts for those freight containers above the deck of a ship. Again, all of those freight containers above the deck of a ship are locked together with locking cones. The first step consists of removing a loaded, above-deck freight container 11, having cones 10 intact, from the deck of a ship. The second step entails coupling the above-deck freight container 11, with cones 10 intact, to a chassis 12 taken from the second staging area. Once again, the chassis in the second staging area do not have locking cones. The third step involves hauling to a chassis row the freight container 11 coupled to chassis 12.

(ii) The second method disclosed, of discharging a freight container 11, using locking cone chassis 12, accounts for those containers below the deck of a ship. Again, all of those freight containers below the deck of a ship are in cell guides and are without locking cones. The first step consists of removing a loaded, below-deck freight container 11 (without cones) from the cell guide of a ship. The second step entails coupling the below-deck freight container 11 to a chassis 12 taken from the first staging area (with cones). Once again, each chassis 12 in the first staging area has four locking cones 10, one in each of the receiver end portions 40. The third step involves hauling away to a chassis row, freight container 11 coupled to chassis 12.

(iii) The third method disclosed, and the first method of load-back of freight container 11, using chassis 12, accounts for those containers 11 below the deck of a ship. The first step of the below-deck load-back consists of hauling to a dock crane, from a chassis row, a freight container 11 coupled to locking cone chassis 12. The second step entails unlocking from freight container 11 cones 10 such that cones 10 remain on chassis 12, but not on container 11. The third step involves loading freight container 11 to a below-deck cell guide. The fourth step includes moving chassis 12, with cones 10 intact, to the first staging area.

(iv) The fourth method disclosed, and the second method of load-back of freight container 11, using locking cone chassis 12, accounts for those containers above the deck of a ship. The first step of above-deck load-back consists of hauling to a dock crane, from a chassis row, freight container 11 coupled to locking cone chassis 12. The second step involves unlocking cones 10 from chassis 12 such that cones 10 remain on freight container 11. The third step entails loading freight container 11, with cones 10 intact, to either a pocket lid directly on the deck (i.e., for the bottom row of above-deck containers), or to be stacked on top of another freight container 11. The fourth step includes moving chassis 12, without cones 10, to the second staging area.

It is to be understood that the present invention is not limited to the sole embodiments described above, but encompasses any and all embodiments within the scope of the following claims.

I claim:

1. A locking cone chassis for accommodating ISO standard inter-modal containers, comprising:

two parallel I-beam main rails, longitudinally disposed, each of said rails having a forward end, a rear end, a pair of inside edges, and a pair of outside edges;

a plurality of ribs parallel to one another situated between the said main rails and connecting the said main rails, said ribs connecting the said main rails at right angles;

a rear cone receiver and a forward cone receiver, each said receiver being positioned parallel to said ribs, said rear cone receiver connecting the rear end of each of said main rails, said forward cone receiver connecting the forward end of each of said main rails;

each said cone receiver comprising a steel square tube having an upper surface, an outside surface, two opposite end surfaces, and an inside surface;

each said receiver further comprising two square-shaped opposing end portions disposed slightly outside of a respective one of said outside edges of said main rails, each of said end portions having a cone-receiving aperture on an upper surface, a first access aperture on said outside surface, a second access aperture on each said end surface, and a third access aperture on said inside surface; and said forward cone receiver further comprising at least one steel guide flange angled upward from said upper surface, proximate said outside surface, between each said inside edge of said main rails;

wherein, each said cone receiving aperture of said chassis receives a self-locking cone, with provision by each said access aperture for access for manually unlocking said cone; and wherein said flange on said forward cone receiver serves both as a container loading guide as well as a container stop, operable when a truck applies its brakes while hauling said chassis.

2. The device according to claim 1, further comprising a self-locking cone disposed within each said cone receiving aperture.

* * * * *